United States Patent [19]

Iwata

[11] 4,342,113
[45] Jul. 27, 1982

[54] LASER APPARATUS

[75] Inventor: Akiyoshi Iwata, Sunnyvale, Calif.

[73] Assignee: Quanta Ray Inc., Mountain View, Calif.

[21] Appl. No.: 144,054

[22] Filed: Apr. 28, 1980

Related U.S. Application Data

[62] Division of Ser. No. 841,019, Oct. 11, 1977, Pat. No. 4,232,276.

[51] Int. Cl.$^3$ ............................................... H01S 3/02
[52] U.S. Cl. ..................................................... 372/33
[58] Field of Search ..................... 331/94.5 D, 94.5 T, 331/94.5 S, DIG. 1, 94.5 R

[56] References Cited

U.S. PATENT DOCUMENTS 3,382,758  5/1968  Wang .............................. 331/DIG. 1
3,783,407  1/1974  Mefferd et al. ................. 331/94.5 T Primary Examiner—James W. Davie
Attorney, Agent, or Firm—Harry E. Aine

[57] ABSTRACT

In a high power laser the optical resonator elements, such as reflectors for the optical resonator and optical pump are supported in optical alignment from a structural beam of generally L-shaped cross section and made of high thermal conductivity material such as copper or aluminum via the intermediary of a plurality of longitudinally directed rods made of a low thermal expansion material such as quartz or Invar. The rods are supported at one end from the L-shaped beam via leaf springs and they are rigidly coupled to the L-shaped beam at their other ends. The remaining elements such as the optical pump, Q switch and polarizers are supported directly from the L-shaped structural beam.

2 Claims, 8 Drawing Figures

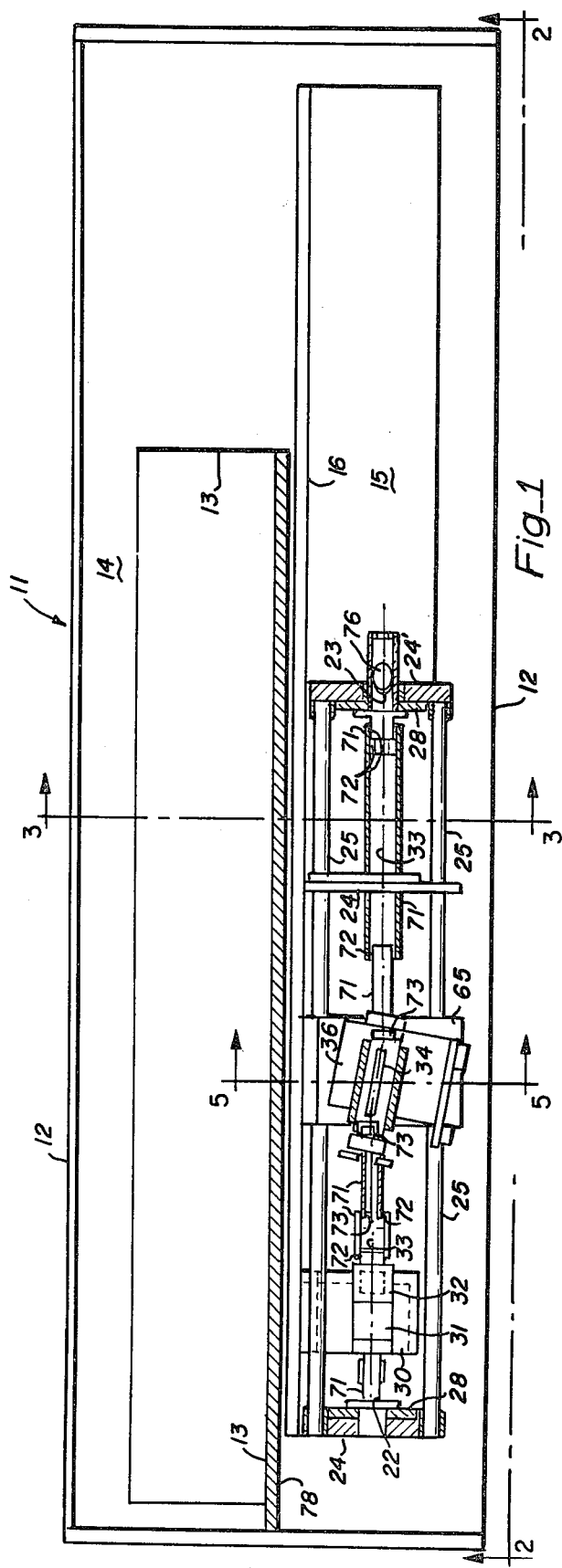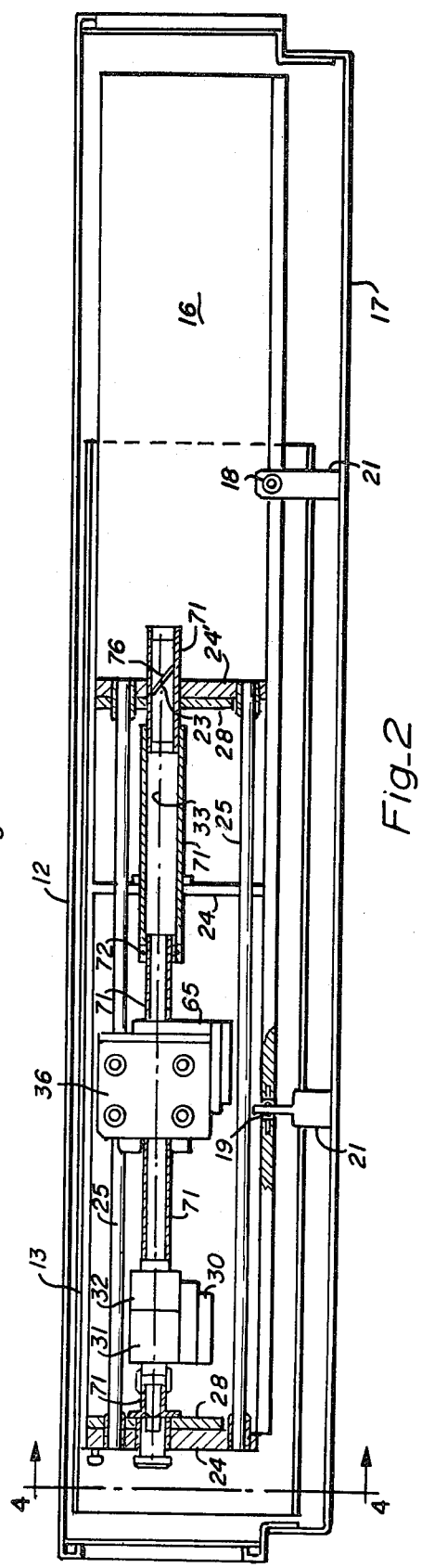

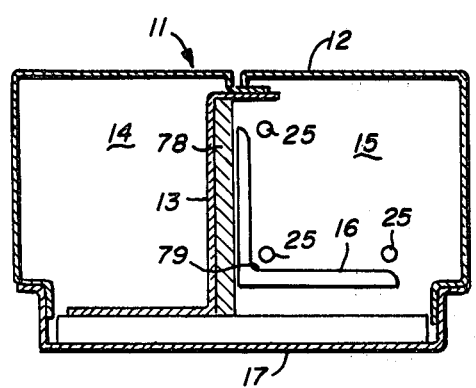
Fig_3
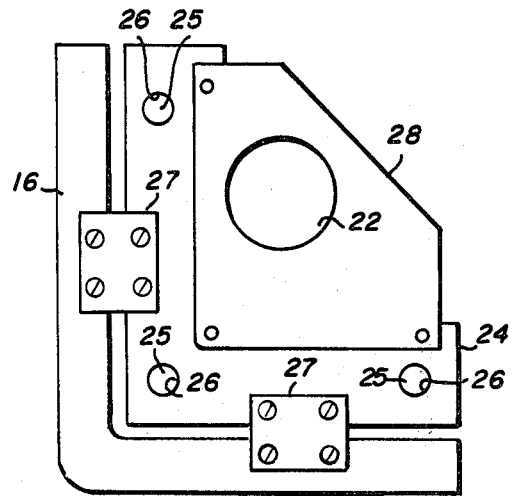
Fig_4
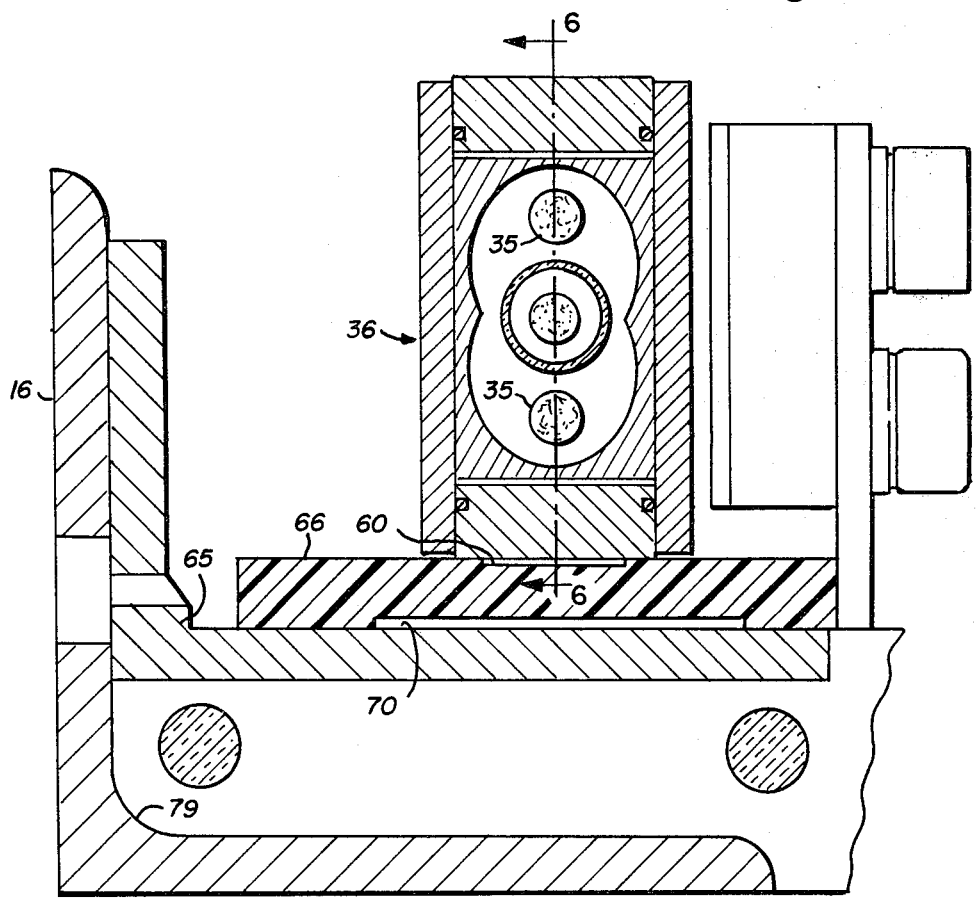
Fig_5

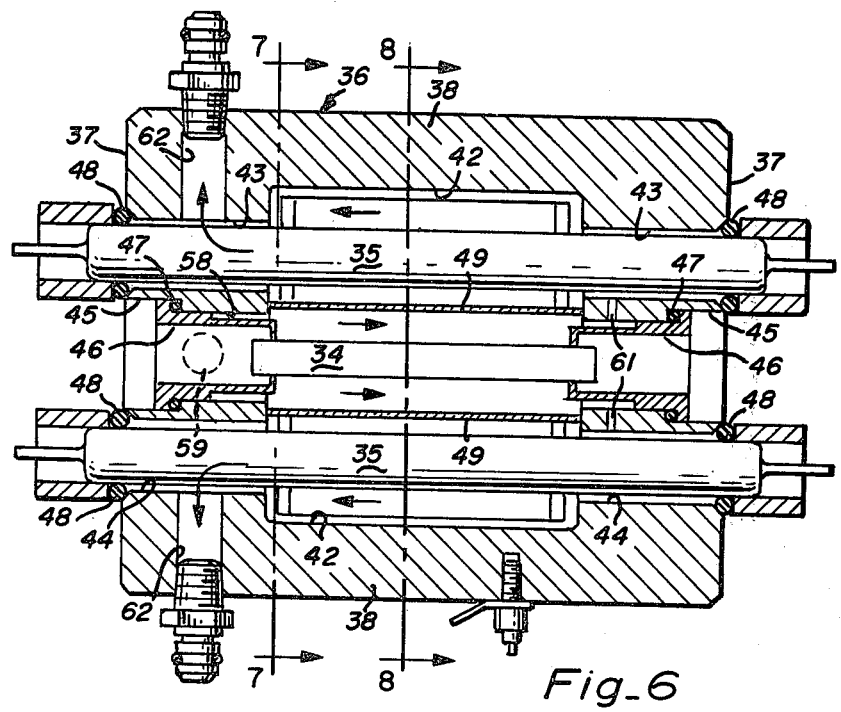
Fig_6
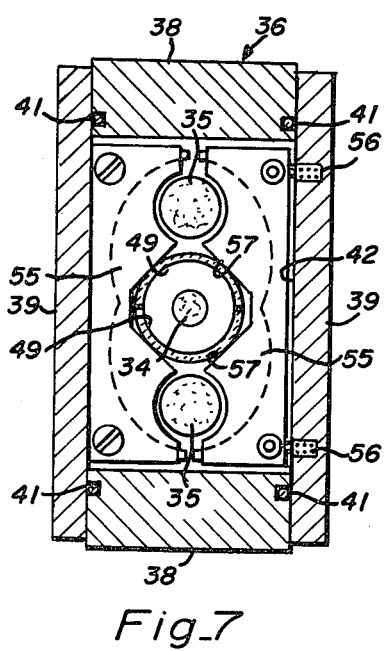
Fig_7
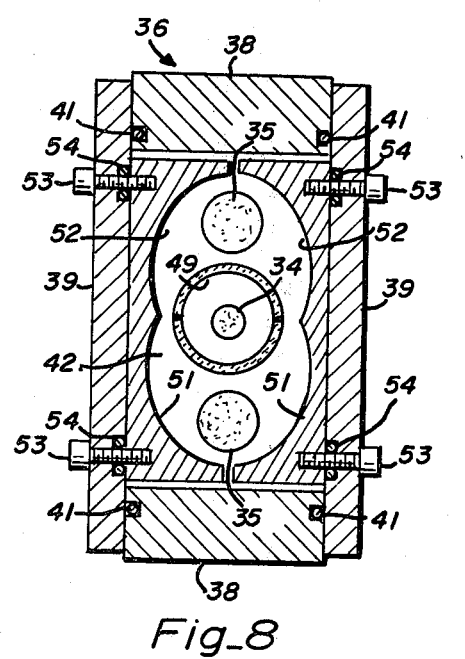
Fig_8

LASER APPARATUS

This is a division of application Ser. No. 841,019, filed Oct. 11, 1977, now U.S. Pat. No. 4,232,276.

BACKGROUND OF THE PRESENT INVENTION

The present invention relates in general to high power lasers and, more particularly, to an improved laser wherein the laser gain medium comprises a rod of lasing material which is pumped with optical radiation derived from flash lamps.

DESCRIPTION OF THE PRIOR ART

Heretofore, lasers have been built wherein the various optical elements of the laser is disposed along the optical axis were supported from a structural beam of generally L-shaped cross-section as of one-eighth inch thick aluminum. The optical resonator mirrors were supported from the beam via the intermediary of three Invar rods. The L-shaped structural beam was strengthened by means of a length of rectangular cross-section tubular aluminum secured to the center of the bottom web member of the L-shaped structural beam.

Several difficulties were encountered in this prior art laser. In particular the L-shaped structural beam did not have sufficient strength even when strengthened by means of the aluminum tube. As a result, thermal stresses produced in the L-shaped beam structure caused torsional distortion of the structural beam with resultant misalignment of the optical elements of the laser. In addition, sagging of the beam caused misalignment of the optical elements.

It is also known from the prior art to employ an optical pumping housing having a pair of flash lamps disposed within elongated elliptical reflectors for reflecting the flash lamp energy into a YAG laser gain medium. The pump housing was cooled by means of water coolant directed to flow between the respective flash lamps and a surrounding glass tube and between the YAG rod and a surrounding glass tube which also served the purpose of an ultraviolet band reject filter. The remaining portion of the optical pump housing was air filled, such air filled space included the region between the optical reflectors and the glass tubes surrounding the flash lamps and between the reflectors and the filter.

One of the problems encountered in this prior art pump housing was that the glass to air interfaces produced a substantial reflective loss, each interface accounting for approximately a 4% loss in the optical pumping radiation. Since the optical radiation emanating from each lamp had to pass through two glass to air interfaces, there was approximately an 8% loss of optical radiation in reaching the YAG laser gain medium. Also, the filter, YAG rod and lamp envelopes were relatively difficult to clean. This turned out to be an important disadvantage because algae formed in the coolant water and deposited on the surfaces coming in contact with the coolant. These deposits further reduce the transmission of energy through the various elements thereby further reducing the efficiency of the optical pump.

SUMMARY OF THE PRESENT INVENTION

The principal object of the present invention is the provision of an improved high power laser and, more particularly, to a high power laser incorporating an improved structural beam support for the various optical elements of the laser.

In one feature of the present invention, various optical elements of the laser are supported from an L-shaped cross-sectional beam of aluminum or copper. A plurality of rods made of a material having a coefficient of thermal expansion less than that of steel extend longitudinally of the L-shaped structural beam member for supporting various optical elements of the laser including the reflectors of the laser optical resonator.

In another feature of the present invention, the longitudinally directed rods of the laser optical resonator are supported from the L-shaped cross section structural beam by means of a leaf spring connected between the rods and the L-shaped member, such leaf spring having an axis of maximum compliance extending generally parallel to the longitudinal axes of said rods.

Other features and advantages of the present invention will become apparent upon a purusal of the following specification taken in connection with the accompanying drawings wherein:

BRIEF DESCRIPTION OF THE DRAWINGS

FIG. 1 is a plan view of a laser incorporating features of the present invention, FIG. 2 is a side view partly in section of the structure of FIG. 1 taken along line 2—2 in the direction of the arrows, FIG. 3 is a transverse sectional view of FIG. 1 taken along line 3—3 in the direction of the arrows, FIG. 4 is a partial transverse sectional view of that portion of the structure of FIG. 2 taken along line 4—4 in the direction of the arrows, FIG. 5 is a sectional view of a portion of the structure of FIG. 1 taken along line 5—5 in the direction of the arrows, FIG. 6 is a sectional view of a portion of the structure of FIG. 5 taken along line 6—6 in the direction of the arrows, FIG. 7 is a sectional view of the structure of FIG. 6 taken along line 7—7 in the direction of the arrows, and FIG. 8 is a sectional view of the structure of FIG. 6 taken along line 8—8 in the direction of the arrows.

DESCRIPTION OF THE PREFERRED EMBODIMENTS

Referring now to FIGS. 1-4, there is shown the laser 11 of the present invention. The laser includes an elongated sheet metal housing 12 of generally rectangular transverse cross section. The housing is longitudinally partitioned via sheet metal partition 13 into a pair of elongated chambers 14 and 15 of generally square cross section. The optical elements of the laser are disposed within chamber 15, whereas the electronic components, power supplies and the like are contained within the electronic chamber 14.

In the optical chamber 15, an elongated beam 16 as of aluminum or copper and of L-shaped cross section is supported from the base 17 of the housing 12 via the intermediary of three spherical bearings. Two of the spherical bearings have axes of revolution directed generally transverse to the longitudinal axis of the beam 16 and are mounted to opposite sides of the center line of the lower flange portion of the beam for supporting the beam at one end at 18. The other end of the beam is supported in the center at 19 by means of a spherical bearing having an axis of revolution parallel to the longitudinal axis of the beam 16 and disposed on the longitudinal center line of the lower flange portion. The spherical bearings 18 and 19 are mounted to the sheet metal base 17 via steel support bars 21 and sheet metal screws, not shown. The spherical bearing mount for the beam 16 is kinematic and permits relative motion between the beam and the base of the housing 17 such that stress is not transmitted from the housing 12 to the beam 16.

Various optical elements of the laser 11 such as the end mirrors 22 and 23 of the optical laser resonator and tubular envelope portion surrounding the beam path are supported from the L-shaped beam via the intermediary of transverse plates 24 affixed to three longitudinally directed rods 25 made of a low thermal expansion material, such as Invar or preferably quartz. The rods 25 pass through the openings in the transverse plates 24. The rods 25 are fixedly secured to end plate 24' which, in turn, is bolted to the L-shaped beam 16. The other ends of the rods 25 are fixedly secured within bores 26 in an L-shaped plate 24. The L-shaped plate 24 (see FIG. 4) is secured to the end of the L-shaped beam 16 via the intermediary of leaf springs 27 which have an axis of maximum compliance along an axis parallel to the longitudinal axis of the L-shaped beam 16. The mirror 22 is fixedly mounted to a transverse plate 28 carried from the L-shaped plate 24. In this manner, the end mirrors 22 and 23 of the optical resonator are fixedly coupled to the rods 25 which have a very low thermal coefficient of expansion so that the dimensions of the optical resonator do not change substantially with changes in temperature of the enviromnent. Relative thermal expansion between the rods 25 and the L-shaped beam is accommodated by means of the leaf springs 27 which rigidly support the rods 25 in a plane transverse to the longitudinal axis of the beam while permitting the beam to expand and contract longitudinally relative to the optical resonator.

A Q switch 31 and a vertical optical polarizer 32 are disposed along the optical beam path 33 within the optical resonator. The Q switch 31 and the polarizer 32 are carried from a generally L-shaped platform 30 which, in turn, is supported from the vertical web of the L-shaped beam 16 via bolts, not shown.

A laser gain medium 34 such as a ¼ inch diameter yttrium aluminum garnet (YAG) rod is disposed within the optical resonator on the optical beam path 33. The YAG rod 34 is pumped with optical pump energy derived from a pump source comprising a pair of Xenon flash lamps 35 (see FIGS. 5-8) carried within a pump housing 36 as of aluminum. The pump housing is of generally rectangular transverse cross section having a pair of longitudinally spaced end wall portions 37 and a pair of longitudinally directed relatively narrow side wall portions 38 closed off by a pair of longitudinally directed relatively broad side wall portions 39. The broad side wall portions 39 are bolted to the narrow side wall portions 38 and a rubber O-ring 41 surrounds the lip of a generally rectangular cavity 42 internally disposed of the pump housing 36. Opposite end wall portions 37 are longitudinally bored at 43, 44 and 45 to receive the Xenon flash lamps 35 and, in the central bore 45, the YAG laser gain medium 34 is carried within two cylindrical end holder sleeve members 46, as by adhesive. The sleeve holders are secured to the bore in a fluid tight manner via O-rings 47 provided at the outer periphery of the holders 46 between the holders and the inside wall of the bore 45. The Xenon lamps 35 are similarly secured in a fluid tight manner to the internal walls of the bores 43 and 44 via O-rings 48. A pair of semi-cylindrical ultraviolet band reject filter sleeve members 49, as of glass, are disposed coaxially surrounding the YAG rod 34 between the YAG rod 34 and the respective lamps 35.

A pair of elliptical reflector structure 51 and 52 are provided within the chamber 42 for focusing light emitted from the lamps 35 through the split filter 49 into the YAG rod 34 for optically pumping the rod so as to invert the population densities of certain predetermined energy levels of the gain medium which are capable of supporting laser transitions at a predetermined wavelength. The reflectors 51 and 52 are split longitudinally such that one-half of each elliptical reflector is carried from one of the side walls 39 and the other half of each reflector is carried from the other wall 39. The reflector assemblies are carried from the side walls 39 via cap screws 53. The cap screws are sealed by means of O-rings 54.

The elliptical reflectors are closed off at opposite ends by means of reflective end plates 55 carried from the ends of the elliptical reflector bodies 52 and 51. One of the reflector end plates 55, on one side of the lamps and filter 49, is fixedly secured to the split reflector assembly, whereas the other end plate 55 is mounted on retaining pins and spring biased via springs 56 carried within the cover plate 39 so that the spring biased end plates 55 serve to clamp split halves of the cylindrical UV filter 49 together via triangular notches 57 formed in the end plates 55 of the reflector assembly.

In operation, a liquid coolant, such as deionized water, is fed into an annular passageway 58 surrounding the YAG rod holder sleeve 46 via a transverse bore 59 provided in one of the end walls of the pump housing 36. The liquid coolant then passes axially over the YAG rod 34 in contact therewith and with the inside surface of the cylindrical UV filter for cooling of the rod and the filter. The coolant thence passes radially through bores 61 into an annular passageway surrounding the lamps 35 and passes axially of the lamps and into that portion of the chamber 42 which is external of the UV filter 49. The coolant thus floods the region between the filter 49 and the lamps and fills all of the space within the reflector assembly 52 such fluid coolant being in contact with the exterior of the lamps, the interior surfaces of the reflectors 51 and 52, and the exterior surfaces of the UV filter 49. The coolant then passes out of the housing 36 via radial bores 62.

The advantage of the pump housing 36 is that it provides good thermal contact between the coolant and the various elements being cooled, such as the reflectors 51 and 52, UV filter 49, lamps 35, and YAG rod 34. Furthermore, the surfaces of these elements which come in contact with the liquid coolant are radially cleaned by removing the side plates 39 and the split UV filter 49 so that the exterior surfaces of the YAG rod 34 may be cleaned of algae and other deposits without disturbing the optical alignment of YAG rod in the optical resonator formed by the mirrors 22 and 23. Also, the liquid coolant interfaces with the various glass elements and reduces the amount of reflective loss due to impedance mismatches, otherwise encountered in the prior art, when air fill was provided for the interior of the reflector assembly. This prior art substantial impedance mismatch between air and glass caused a 4% reflection loss at each such interface. The water/glass interface as provided in the housing of FIGS. 5-8 provides less than a 1% reflective loss, thereby substantially improving the optical efficiency of the optical pump.

Referring now to FIGS. 1, 2 and 5, the pump housing 36 is carried from the L-shaped beam 16 via the intermediary of a second L-shaped support bracket 65, as of aluminum. The aluminum support bracket 65 interfaces with the housing 36 via the intermediary of a one-half inch thick thermally insulative plastic plate 66, as of polycarbonate plastic material. The housing 36 is bolted to the plastic plate 66 and the plate 66 is in turn bolted to the bracket 65 which in turn is bolted to the beam 16. The interfacing regions between the housing 36 and the polycarbonate plate 66 are recessed by recessing the plate 66 at 60 so as to reduce thermal conduction from the pump housing into the plate 66. Likewise the plate 66 is recessed at its interface 70 with the bracket 65 to further reduce thermal conduction thereto. In this manner, the pump housing 36 is thermally isolated from the support beam 16.

A segmented tubular envelope 71 (see FIGS. 1 and 2) surrounds the optical axis 33 and is hermetically sealed to the various elements along the optical beam path via O-ring seals 72. Absorbing glass rings 73 are disposed along the beam path at various points, typically on opposite sides of elements within the system which could reflect infrared energy, for absorbing infrared energy reflected from the various optical elements along paths at an angle to the optical beam path. Such a heat absorbing glass is an ion doped glass to absorb infrared radiation, such material is available from Edmond Scientific of New York City, N.Y.

The tubular envelope 71 serves the purpose of preventing dust from collecting on the various optical elements along the beam path which could serve to produce unwanted heating and subsequent degradation of the optical surfaces within the laser.

The optical beam is extracted from the optical resonator via the output mirror 23 which is a small post carried from a Brewster angle window 76 disposed within a section of the tubular envelope 71. Output beam energy is contained in an annular beam which is coupled out around the outside of the output mirror 23. The output beam energy is collimated along the beam path and may be directed through various other optical elements, such as a YAG amplifier, etc. Which may be carried from the L-shaped beam 16.

The electronics compartment 14 is thermally isolated from the L-shaped beam 16, in the optical compartment 15, via the intermediary of a sheet of rubber foam thermal insulation 78 affixed to the inside wall of the optical compartment 15. In this manner, heat sources and heat sinks within the electronic compartment 14 do not produce thermal stresses in the L-shaped support beam 16 because of the thermal lagging of the insulative sheet 78 and the thermal conductivity of the L-shaped beam 16. The L-shaped beam preferably has a web thickness greater than 3/16 of an inch and is preferably 0.5 inch thick and is made of copper or aluminum so as to provide an isothermal beam to prevent thermal stresses and deformations. In addition, (FIG. 5) the radius of curvature of a fillet 79 between the vertical and horizontal intersecting web portions of the L-shaped beam preferably has a radius of curvature in excess of one-half inch for substantially increasing the torsional strength of the L-shaped beam 16.

What is claimed is:

1. In a laser:

laser gain medium means for excitation with optical pump energy for inverting the population densities of certain predetermined energy levels of said gain medium which are capable of supporting laser transitions of a predetermined wavelength;

optical resonator means for reflecting optical radiation at said predetermined laser transition wavelengths to and fro through said laser gain medium means;

pump means for supplying optical pump energy to said laser gain medium;

elongated support means for physically supporting said laser gain medium means and said optical resonator means, said support means including an elongated beam member having a portion of generally L-shaped cross section, said L-shaped beam member portion being made of aluminum or copper, a plurality of rods made of a material having a coefficient of thermal expansion less than that of steel extending longitudinally of said L-shaped member portion, means for supporting said rods from said L-shaped member portion, and means for supporting said resonator means from said rods;

said means for supporting said rods from said L-shaped member portion including, leaf spring means connected between said rods and said L-shaped member portion, said leaf spring means having an axis of maximum compliance extending generally parallel to the longitudinal axes of said rods, whereby said rods are rigidly supported from said L-shaped member portion in a direction orthogonal to said longitudinal axes of said rods and flexibly supported from said L-shaped member portion in a direction parallel to the longitudinal axes of said rods.

2. The apparatus of claim 1 wherein said leaf spring means are mounted to said rods substantially at one end of said rods and including means for rigidly mounting the other ends of said rods to said L-shaped member portion.

* * * * *